United States Patent Office 3,390,185
Patented June 25, 1968

3,390,185
ALKOXYVINYLCYCLOBUTANONE COMPOUNDS AND PROCESS FOR THEIR PREPARATION
James C. Martin, Kingsport, Tenn., assignor to Eastman Kodak Company, Rochester, N.Y., a corporation of New Jersey
No Drawing. Filed Dec. 23, 1964, Ser. No. 420,790
8 Claims. (Cl. 260—586)

ABSTRACT OF THE DISCLOSURE

Ketenes are reacted with 1,3-butadiene compounds to form 3-alkoxyvinylcyclobutanone and 3-aryloxyvinylcyclobutanone compounds having utility, for example as plasticizers for cellulose acetate butyrate.

---

This invention relates to novel chemical compounds and to their preparation. More particularly it relates to novel 3-alkoxyvinylcyclobutanone and 3-aryloxyvinylcyclobutanone compounds and to a novel process for their preparation.

The novel 3-alkoxyvinylcyclobutanone and 3-aryloxyvinylcyclobutanone compounds of the invention have the formula:

(1) 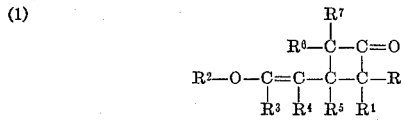

wherein R and $R^1$ each represents hydrogen or an alkyl radical, $R^2$ represents an alkyl radical having 1 to 4 carbon atoms or a monocyclic aryl nucleus of the benzene series, $R^3$, $R^4$, $R^5$, $R^6$ or $R^7$ each represents hydrogen or an alkyl radical having 1 to 4 carbon atoms and wherein R and $R^1$ collectively, together with the carbon atom to which they are attached represent cyclopentylidene or cyclohexylidene.

In accordance with the process of the invention the novel cyclobutanone compounds of the invention are prepared by combining a ketene having the formula:

(2) 

with a 1,3-butadiene compound having the formula:

(3) 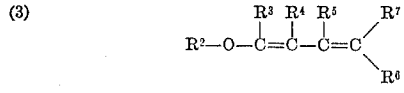

wherein R, $R^1$, $R^2$, $R^3$, $R^4$, $R^5$, $R^6$, $R^7$ and

(collectively) have the meaning previously assigned to them.

In carrying out the process of the invention equimolar proportions of the ketene and the 1,3-butadiene reactants were ordinarily employed. However, an excess of the 1,3-butadiene reactant can be employed if desired and was done so, for example, in the case of Example 2 hereinafter.

Temperatures in the range of from about 0° C. to about 180° C. can be used in carrying out the novel process of the invention. Normally a temperature of from 25° C. to 150° C. is employed. The reaction temperature employed is generally governed by the nature of the reactants. The higher molecular weight ketenes and alkoxybutadiene or aryloxybutadiene compounds require higher temperatures for practical operation. Thus, the higher the molecular weight of the reactants the higher the reaction temperature will be. The ketenes used can be introduced as pure materials or as the main component of a pyrolysate from a thermal cracking operation, or they can be generated in situ from the corresponding acid halides [Opitz and Kleeman, Ang. Chem. (Eng. Ed.), 1, 51 (1962)].

The process of the invention can be carried out with or without the use of a solvent. Ordinarily a solvent is used to help control the reaction and at times to provide a more favorable polar environment for the reaction. The butadiene reactant can also serve as a solvent for the reaction when it is used in suitable excess over the amount required for the reaction. Suitable solvents are materials that serve to dissolve the reagents involved in the process but which do not react with them. Suitable solvents include, for example, esters, ethers, aliphatic and aromatic hydrocarbons, chlorinated hydrocarbons, nitriles, substituted amides, nitro compounds and cyclic carbonates. Specific examples of suitable inert solvents include, for example, diethyl ether, diisopropyl ether, dioxane, tetrahydrofuran, diethylketone, methylisobutylketone, hexane, naphtha, isooctane, benzene, nitrobenzene, toluene, xylene, carbon tetrachloride, chloroform, tetrachloroethane, acetonitrile, isobutyronitrile, ethyl acetate, butyl acetate, etc., and dipolar aprotic solvents such as dimethyl sulfoxide, dimethyl formamide, ethylene carbonate, sulfonate, etc. The function of the solvent can be quite important because in some cases the use of polar solvents accelerates the reaction and frequently increases the yield.

When R and $R^1$ are alkyl each typically represents an alkyl radical having 1 to 8 carbon atoms such as methyl, ethyl, propyl, isopropyl, butyl, sec. butyl, tert. butyl, pentyl hexyl, heptyl, octyl, 2-ethylhexyl, etc. although they can be a higher alkyl radical such as nonyl, decyl, undecyl, dodecyl, tridecyl, pentadecyl and octadecyl, for example. In general, R and $R^1$ are preferably lower alkyl, e.g., of 1 to 4 carbon atoms.

When $R^2$ is alkyl generally it is preferably methyl or ethyl. When $R^2$ is aryl generally it is preferably phenyl. $R^3$, $R^4$, $R^5$, $R^6$ or $R^7$ ordinarily are hydrogen. When these members represent alkyl the alkyl radical is preferably methyl or ethyl and is usually methyl.

Illustrative of the ketenes having the formula 2 are ketene, methylketene, ethylketene, propylketene, isopropylketene, butylketene, isobutylketene, tertiarybutylketene, pentylketene, hexylketene, heptylketene, octylketene, 2-ethylhexylketene, nonylketene, deceylketene, undecylketene, dodecylketene, tridecylketene, tetradecylketene, pentadecylketene, hexadecylketene, heptadecylketene, octadecylketene, dimethylketene, ethylmethylketene, diethylketene, methylpropylketene, ethylpropylketene, ethylisopropylketene, dipropylketene, diisopropylketene, ethylbutylketene, isobutylethylketene, dibutylketene, diisobutylketene, di(tert. butyl)ketene, dipentylketene, dihexylketene, diheptylketene, dioctylketene, di(2-ethylhexyl)ketene, ethyldodecylketene, didodecylketene, dipentadecylketene, dihexadecylketene, dioctadecylketene, methylpropylketene, isobutylethylketene, pentamethyleneketene, hexamethyleneketene, phenylketene, p-methylphenylketene, p-methyl phenylketene, p-methoxyphenylketene, p-ethoxyphenylketene, diphenylketene and di(p-methylphenyl)ketene, for example.

1-methoxy-1,3-butadiene, 1-ethoxy-1,3-butadiene, 1-propoxy-1,3-butadiene, 1-isopropoxy-1,3-butadiene, 1-butoxy-1,3-butadiene, 1-methoxy-1,3-pentadiene, 1-methoxy-2-methyl-1,3-butadiene, 2-ethyl-1-methoxy-1,3-pentadiene, 2-ethyl-1-methoxy-1,3-hexadiene, 1-methoxy-3-methyl-1,3-butadiene, 1-phenoxy-1,3-butadiene, 1-phenoxy-1,3-pentadiene, 1-phenoxy-1,3-hexadiene, 1-p-methylphenoxy-1,3-butadiene, 1-p-methoxyphenoxy-1,3-butadiene and 1-p- ethoxyphenoxy-1,3-butadiene, for example, are illustrative of the 1,3-butadiene compounds used in preparing the new 3-alkoxyvinylcyclobutanone and the new 3-aryloxyvinylcyclobutanone compounds of the invention.

Hurd and Kimbrough, J. Am. Chem. Soc., 82, pages 1373–1376 (1960) disclose that diphenylketene and ethyl vinyl ether were reacted together to form 2,2-diphenyl-3-ethoxycyclobutanone. There is no suggestion in the Hurd and Kimbrough article of the new cyclobutanone compounds disclosed herein.

Staudinger and Meyer, Helv. Shim. Acta 7, pages 19–22 (1924) disclose that dimethylketene and ethyl vinyl ether react to form a cyclobutanone and that diphenylketene and ethyl vinyl ether react to form a cyclobutaone. Staudinger and Meyer were not certain of the structure of the cyclobutanone compounds obtained.

Kimbrough (Thesis, Northwestern University, 1959, pages 34, 63 and 64) confirmed that dimethylketene and diphenylketene each react with ethyl vinyl ether and established that 2,2-dimethyl-3-ethoxycyclobutanone and 2,2-diphenyl-3-ethoxycyclobutanone, respectively, were obtained rather than the compounds reported by Staudinger and Meyer.

The reaction of ketenes having the Formula 2 with 1,3-butadienes having the Formula 3 to give the cyclobutanone compounds having the Formula 1 is believed to be novel and unexpected. By analogy with the prior art and assuming that the ketenes having the Formula 2 would react with the 1,3-butadiene compounds having the Formula 3 the compounds obtained would be expected to have the formula:

(4)
$$R^7-\overset{R^6}{\underset{R^2-O-\overset{R^3}{\underset{R^1}{C}}-\overset{}{\underset{}{C}}-R}{C}}=\overset{R^5}{\underset{}{C}}-\overset{R^4}{\underset{}{C}}-C=O$$

Both the process and the cyclobutanone compounds of the invention are believed to be novel and unexpected.

The novel cyclobutanone compounds of the invention are useful, for example, as plasticizers for cellulose acetate butyrate.

The following examples illustrate the invention:

Example 1

CH$_2$=CH—CH=CH—OCH$_3$ + (CH$_3$)$_2$C=C=O ⟶

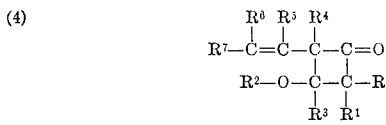

To a stirred solution of 101 g. (1.2 moles) of 1-methoxy-1,3-butadiene in 300 ml. of ether under nitrogen were added 84 g. (1.2 moles) of dimethylketene over a period of 15 minutes. The resulting solution was stirred for several hours at room temperature and then distilled through a 10-in. packed column to give unconverted 1-methoxy-1,3-butadiene, tetramethyl-1,3-cyclobutanedione, and 67 g. of 3-(2-methoxyvinyl)-2,2-dimethylcyclobutanone, B.P. 88–90° (9.5 mm.), $n_D^{20}$ 1.4646.

*Analysis.*—Calc'd for C$_9$H$_{14}$O$_2$: C, 70.2; H, 9.1; mol. wt., 154. Found: C, 69.9; H, 9.3; mol. wt. (by B.P. elevation in benzene), 152.5. The infrared spectrum of this product showed absorptions at 5.65μ (cyclobutanone) and 6.1μ (vinyl or substituted vinyl ether). The n.m.r. spectrum was also entirely consistent with the structure shown. It showed the following peaks (at 40 megacycles in cycles per second with reference to tetramethylsilane as an internal standard): doublet centered at —260

$$(-O\overset{H}{\underset{}{C}}=C-)$$

pair of doublets centered at —190

$$(O\overset{}{\underset{}{C}}=\overset{H}{\underset{}{C}}-)$$

multiple peaks centered at —115

$$(-\overset{H}{\underset{}{C}}-\overset{}{\underset{}{C}}H_2)$$

doublet at —39 and —45

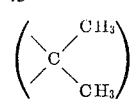

Example 2

A mixture (solution) of 84 g. (1 mole) of 1-methoxy-1,3-butadiene and 63 g. (0.5 mole) of butylethylketene was heated in a steel autoclave at 150° C. for 4 hrs. This solution was distilled through a 12-in. packed column to give 68.5 g. of 3-(2-methoxyvinyl)-2-butyl-2-ethylcyclobutanone, B.P. 95–98° (3 mm.).

*Analysis.*—Calc'd for C$_{13}$H$_{22}$O$_2$: C, 74.4; H, 10.5; mol. wt., 210. Found: C, 74.4; H, 10.6; mol. wt. (B.P. elevation in benzene), 212.

Example 3

Under the general conditions of Example 1, the following ketenes and 1,3-butadienes give the products shown.

| Ketene | 1,3-butadiene | Product |
|---|---|---|
| 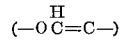 (Pentamethyleneketene) | C$_4$H$_9$OCH=CHCH=CH$_2$ | 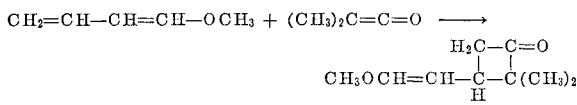 |
| (C$_2$H$_5$)$_2$C=C=O | C$_6$H$_5$OCH=CHCH=CH$_2$ | 3-(2-phenoxyvinyl)-2,2-diethylcyclobutanone. |
| (CH$_3$)$_2$C=C=O | CH$_3$OCH=$\overset{CH_3}{\underset{}{C}}$CH=CH$_2$ | 3-(1-methyl-2-phenovinyl)-2,2-dimethylcyclobutanone. |
| Tetramethylene 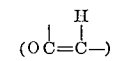 | CH$_3$OCH=CHCH=CH$_2$ | 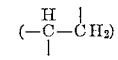 |
| Dimethylketene | CH$_3$OCH=CHCH=CHCH$_3$ | 4-methyl 3-(2-methoxyvinyl)-2,2-dimethylcyclobutanone. |
| Do | CH$_3$OCH=CHCH=CHC$_2$H$_5$ | 4-ethyl-3-(2-methoxyvinyl)-2,2-dimethylcyclobutanone. |
| Do | CH$_3$OCH=CHCH=CHC$_3$H$_7$(n) | 4-n-propyl-3-(2-methoxyvinyl)-2,2-dimethylcyclobutanone. |
| Do | CH$_3$OCH=CHCH=CH(C$_4$H$_9$)n | 4-n-butyl-3-(2-methoxyvinyl)-2,2-dimethylcyclobutanone. |
| Do | C$_6$H$_5$OCH=CHCH=CH$_2$ | 3-(2-phenoxyvinyl)-2,2-dimethylcyclobutanone. |

| Ketene | 1,3-butadiene | Product |
|---|---|---|
| Do | $CH_3OCH=CH\underset{\underset{CH_3}{\mid}}{C}=CH_2$ | 3-methyl-3-(2-methoxyvinyl)-2,2-dimethylcyclobutanone. |
| Do | $CH_3O\underset{\underset{CH_3}{\mid}}{C}=CHCH=CH_2$ | 3-($CH_3OC=CH$)-2,2-dimethylcyclo-$\underset{\mid}{CH_3}$ butanone. |
| Diethylketene | $CH_3OCH=CHCH=CH_2$ | 3-(2-methoxyvinyl)-2,2-dimethylcyclobutanone. |
| Ethylmethylketene | $CH_3OCH=CHCH=CH_2$ | 3-(2-methoxyvinyl)-2-methyl-2-ethylcyclobutanone. |

Example 4

Under the general conditions of Example 2, the following ketenes and 1,3-butadienes give the products shown.

| Ketene | 1,3-butadiene | Product |
|---|---|---|
| $(C_4H_9)_2C=C=O$ | $C_2H_5OCH=CHCH=CHCH_3$ | $C_2H_5OCH=CH\overset{CH_3\boxed{\phantom{xx}}=O}{\phantom{xxx}}(C_4H_9)_2$ |
| $(C_8H_{17})_2C=C=O$ | $CH_3OCH=CH\underset{\underset{CH_3}{\mid}}{C}=CH_2$ | $CH_3OCH=CH\overset{\boxed{\phantom{xx}}=O}{\underset{\underset{CH_3}{\mid}}{\phantom{xxx}}}(C_8H_{17})_2$ |
| $\underset{C_2H_5}{\overset{C_4H_9}{\diagdown}}C=C=O$ | $CH_3O\underset{\underset{CH_3}{\mid}}{C}=CHCH=CH_2$ | $CH_3O\underset{\underset{CH_3}{\mid}}{C}=CH\overset{\boxed{\phantom{xx}}=O}{\phantom{xx}}\underset{\underset{C_2H_5}{\mid}}{C_4H_9}$ |
| Ketene | $CH_3OCH=CHCH=CH_2$ | 3-(2-methoxyvinyl) cyclobutanone. |
| Methylketene | $CH_3OCH=CHCH=CH_2$ | 3-(2-methoxyvinyl)-2-methylcyclobutanone. |
| Ethylketene | $CH_3OCH=CHCH=CH_2$ | 3-(2-methoxyvinyl)-2-ethylcyclobutanone. |
| Propylketene | $CH_3OCH=CHCH=CH_2$ | 3-(2-methoxyvinyl)-2-propylcyclobutanone. |
| Isopropylketene | $CH_3OCH=CHCH=CH_2$ | 3-(2-methoxyvinyl)-2-isopropylcyclobutanone. |
| Butylketene | $CH_3OCH=CHCH=CH_2$ | 3-(2-methoxyvinyl)-2-butylcyclobutanone. |
| Hexylketene | $CH_3OCH=CHCH=CH_2$ | 3-(2-methoxyvinyl)-2-hexylcyclobutanone. |
| Octylketene | $CH_3OCH=CHCH=CH_2$ | 3-(2-methoxyvinyl)-2-octylcyclobutanone. |
| Decylketene | $CH_3OCH=CHCH=CH_2$ | 3-(2-methoxyvinyl)-2-decylcyclobutanone. |
| Dodecylketene | $CH_3OCH=CHCH=CH_2$ | 3-(2-methoxyvinyl)-2-dodecylcyclobutanone. |
| Octadecylketene | $CH_3OCH=CHCH=CH_2$ | 3-(2-methoxyvinyl)-2-octadecylcyclobutanone. |
| Ethylpropylketene | $CH_3OCH=CHCH=CH_2$ | 3-(2-methoxyvinyl)-2-propyl-2-ethylcyclobutanone. |
| Dipropylketene | $CH_3OCH=CHCH=CH_2$ | 3-(2-methoxyvinyl)-2,2-dipropylcyclobutanone. |
| Diisopropylketene | $CH_3OCH=CHCH=CH_2$ | 3-(2-methoxyvinyl)-2,2-diisopropylcyclobutanone. |
| Dibutylketene | $CH_3OCH=CHCH=CH_2$ | 3-(2-methoxyvinyl)-2,2-dibutylcyclobutanone. |
| Ethylbutylketene | $CH_3OCH=CHCH=CH_2$ | 3-(2-methoxyvinyl)-2-ethyl-2-butylcyclobutanone. |
| Dihexylketene | $CH_3OCH=CHCH=CH_2$ | 3-(2-methoxyvinyl)-2,2-dihexylcyclobutanone. |
| Dioctylketene | $CH_3OCH=CHCH=CH_2$ | 3-(2-methoxyvinyl)-2,2-dioctylcyclobutanone. |
| Didecylketene | $CH_3OCH=CHCH=CH_2$ | 3-(2-methoxyvinyl)-2,2-didecylcyclobutanone. |
| Didodecylketene | $CH_3OCH=CHCH=CH_2$ | 3-(2-methoxyvinyl)-2,2-didodecylcyclobutanone. |
| Dipentadecylketene | $CH_3OCH=CHCH=CH_2$ | 3-(2-methoxyvinyl)-2,2-dipentadecylcyclobutanone. |
| Dihexadecylketene | $CH_3OCH=CHCH=CH_2$ | 3-(2-methoxyvinyl)-2,2-dihexadecylcyclobutanone. |
| Dioctadecylketene | $CH_3OCH=CHCH=CH_2$ | 3-(2-methoxyvinyl)-2,2-dioctadecylcyclobutanone. |
| Dibutylketene | $C_6H_5OCH=CHCH=CH_2$ | 3-(2-phenoxyvinyl)-2,2-dibutylcyclobutanone. |
| Do | $C_6H_5OCH=CHCH=CHC_2H_5$ | 4-ethyl-3-(2-phenoxyvinyl)-2,2-dibutylcyclobutanone. |

Example 5

Twenty parts (by weight) of 3-(2-methoxyvinyl)-2-butyl-2-ethylcyclobutanone and 80 parts (by weight) of cellulose acetate butyrate were milled together on heated rolls. The milling was carried out for 4 minutes at 270° F. using a Thropp milling machine. Any other suitable milling machine can be employed. The resulting plastic was tough and flexible, and possesses good properties when fabricated into molded objects.

The ketene compounds employed in the preparation of the novel compounds of the invention can be prepared by methods known in the art, for instance, by methods described in "Organic Reactions," John Wiley and Sons, Inc., N.Y., (1946) vol. III. Chapter 3. The dialkyl ketene reactants can also be prepared by the method described in copending application, Hasek and Elam, Ser. No. 841,961, filed Sept. 24, 1959 and in Hasek and Elam Canadian Patent 618,772.

Many of the 1,3-butadiene compounds having the Formula 3 are known compounds.

1,3-butadiene compounds having the Formula 3 can be prepared as follows:

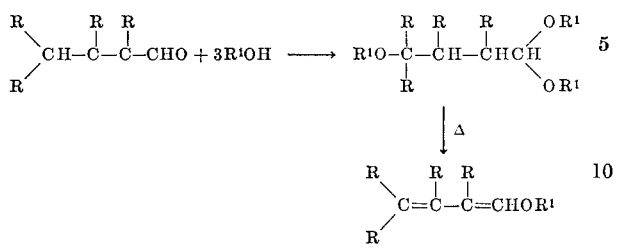

wherein each R represents hydrogen or an alkyl radical (e.g. having 1 to 4 carbon atoms) and $R^1$ represents an alkyl radical (e.g. having 1 to 4 carbon atoms) or a monocyclic aryl nucleus of the benzene series.

1,3-butadiene compounds are also described by W. Flaig, Ann., 568, 1 (1950). The reaction shown being:

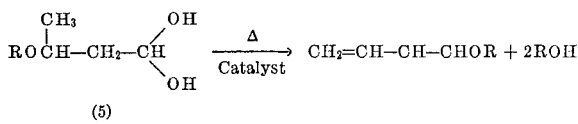

The compounds having the Formula 5 are made from crotonaldehyde and an alcohol.

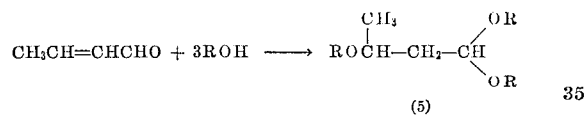

By the use of other appropriate unsaturated aldehydes the method of Flaig can be used to prepare many of the 1,3-butadiene compounds having the Formula 3.

Although the invention has been described in considerable detail with particular reference to certain preferred embodiments thereof, variations and modifications can be effected within the spirit and scope of the invention as described hereinbefore, and as defined in the appended claims.

I claim:

1. The cyclobutanone compounds having the formula:

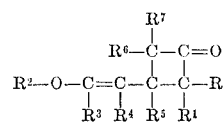

wherein R and $R^1$ each represents a member selected from the group consisting of hydrogen and an alkyl radical having 1 to 18 carbon atoms; $R^2$ represents a member selected from the group consisting of an alkyl radical having 1 to 4 carbon atoms, phenyl, methylphenyl, methoxyphenyl and ethoxyphenyl; $R^3$, $R^4$, $R^5$, $R^6$ and $R^7$ each represents a member selected from the group consisting of hydrogen and an alkyl radical having 1 to 4 carbon atoms and wherein R and $R^1$ collectively, together with the carbon atom to which they are attached represent a member selected from the group consisting of cyclopentylidene and cyclohexylidene.

2. The cyclobutanone compounds having the formula:

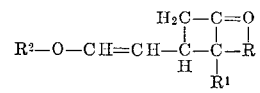

wherein R and $R^1$ each represents an alkyl radical having 1 to 18 carbon atoms and $R^2$ represents an alkyl radical having 1 to 4 carbon atoms.

3. The compounds of claim 2 wherein $R^2$ is methyl.
4. 3-(2-methoxyvinyl)-2,2-dimethylcyclobutanone.
5. 3-(2-ethoxyvinyl)-2,2-dimethylcyclobutanone.
6. 3-(2-methoxyvinyl)-2-n-butyl-2-ethylcyclobutanone.
7. The compound having the formula:

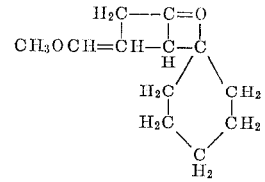

8. 3-(2-phenoxyvinyl)-2,2-dimethylcyclobutanone.

References Cited

Adams et al.: "Organic Reactions," vol. 12, pp. 34, 35 and 48 to 51 (1962).

BERNARD HELFIN, *Primary Examiner.*

LEON ZITVER, *Examiner.*

M. JACOB, *Assistant Examiner.*

UNITED STATES PATENT OFFICE
CERTIFICATE OF CORRECTION

Patent No. 3,390,185                                   June 25, 1968

James C. Martin

It is certified that error appears in the above identified patent and that said Letters Patent are hereby corrected as shown below:

Column 8, lines 1 to 5, the formula should appear as shown below:

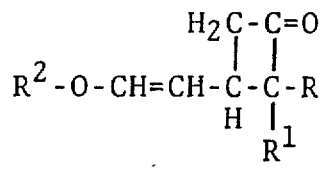

same column 8, lines 31 to 39, the formula should appear as shown below:

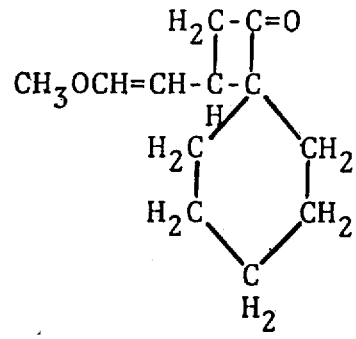

Signed and sealed this 16th day of December 1969.

(SEAL)
Attest:

EDWARD M. FLETCHER, JR.                         WILLIAM E. SCHUYLER, JR.
Attesting Officer                                       Commissioner of Patents